Figure 1:
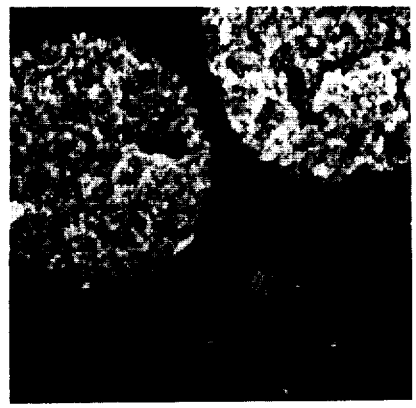

United States Patent
Takayama et al.

[11] 3,928,254
[45] Dec. 23, 1975

[54] UNIFORMLY PIGMENTED UNSATURATED POLYESTER RESIN MOLDED ARTICLES

[75] Inventors: Yuzi Takayama, Kamakura; Yutaka Ichimura, Tokyo; Takanobu Aoyagi; Takahiro Kishino, both of Yokohama, all of Japan

[73] Assignee: Mitsubishi Rayon Co., Ltd., Tokyo, Japan

[22] Filed: Aug. 3, 1973

[21] Appl. No.: 385,346

[30] Foreign Application Priority Data
Aug. 4, 1972  Japan.................. 47-77712

[52] U.S. Cl. ......... 260/2.5 B; 260/2.5 N; 260/23 P; 260/22 CQ; 260/40 R; 260/862
[51] Int. Cl.$^2$ .................. C08J 9/00; C08L 67/00
[58] Field of Search ............ 260/2.5 N, 862, 2.5 B, 260/40 R

[56] References Cited
UNITED STATES PATENTS

| | | |
|---|---|---|
| 2,797,201 | 6/1957 | Veatch et al................. 260/2.5 B |
| 2,806,509 | 9/1957 | Bozzacco et al............... 260/2.5 B |
| 3,227,665 | 1/1966 | Fourcade et al............... 260/2.5 N |
| 3,230,184 | 1/1966 | Alford et al.................. 260/2.5 N |
| 3,232,893 | 2/1966 | Salgado et al................ 260/2.5 N |
| 3,260,688 | 7/1966 | Watanabe et al.............. 260/2.5 N |
| 3,786,004 | 1/1974 | Furuya et al................. 260/2.5 N |

*Primary Examiner*—Richard B. Turer
*Attorney, Agent, or Firm*—Armstrong, Nikaido & Wegner

[57] ABSTRACT

A filler- and fiber-reinforced, uniformly pigmented, unsaturated polyester resin molded article having low profile, which has a structure that unconnected hollow balls having a diameter of 5 to 300$\mu$ with a wall of styrene polymer containing 0.1 to 6 % by weight of carboxyl group, the wall having a thickness of 1 to 50$\mu$, are dispersed in a cured $\alpha,\beta$-ethylenically unsaturated polyester-styrene copolymer matrix, said styrene polymer having a refractive index less than 0.05 different from that of the copolymer, the total volume of the voids of the hollow balls being 10 to 25 % by volume based on the volume of the copolymer.

10 Claims, 4 Drawing Figures

X 200

X 700

X 200

X200

X200

UNIFORMLY PIGMENTED UNSATURATED POLYESTER RESIN MOLDED ARTICLES

This invention relates to a uniformly pigmented unsaturated polyester molded article having low profile.

Molding compounds based on unsaturated polyesters contain inorganic fillers and reinforcing glass fibers, and molded articles obtained from said molding compounds have widely been used in automobiles, furniture, utensils, etc. Unsaturated polyesters blended with thermoplastic polymers can give molded articles which have a greatly improved dimension stability, extremely lowered shrinkage and markedly enhanced surface smoothness, and hence, are being expected to bring about an improvement in molding-workability and an enlargement in use. Typical unsaturated polyester resin compositions are those disclosed in, for example, British Pat. Nos. 1,098,132 and 1,201,087, U.S. Pat. No. 3,701,748 and South African Pat. No. 697,214 and Japanese Pat. Publication No. 15,431/1971. Compounds containing these resin compositions are sufficiently thickened with a thickening agent, but it is very difficult to obtain uniformly pigmented molded articles having a low shrinkage from said compounds. Accordingly, unsaturated polyester resin molded articles are still greatly restricted in uses other than where they are used with their original colors.

In order to overcome the defects in pigmentation to obtain molded articles which are not unevenly colored and colored to any desired color, many attempts have been made. In these attempts, it has been considered that causes for the defects in pigmentation are a difference in colorability with pigment between the copolymer of unsaturated polyester and monomeric styrene and the thermoplastic resin, and a separation of the unsaturated polyester resin portion from the thermoplastic resin portion. In order to solve the above problem, such attempts have been made as selection of pigments which can color equally the copolymer and the thermoplastic resin, strong stirring so that the pigment, the unsaturated polyester resin and the thermoplastic resin are sufficiently mixed with or dispersed in one another, and making a one-pack type unsaturated polyester resin composition in which separation is relatively difficult to cause. However, not only have these attempts been unsuccessful, but such a pessimistic view has been also generallized that the separation of the thermoplastic resin is the necessary phenomenon for obtaining a molded article having low profile even if there is a difference in degree and it is inevitable that a low-profile, unsaturated polyester resin molded article has a defect in pigmentation.

The present inventors have done extensive research in this connection to find quite a different cause from mentioned above and consequently succeeded in obtaining a uniformly pigmented molded article having low profile.

An object of this invention is to provide a uniformly pigmented molded article of unsaturated polyester resin.

Another object of this invention is to provide an unsaturated polyester molded article having a novel structure.

A further object of the invention is to provide a uniformly pigmented unsaturated polyester resin molded article having low profile.

Other objects and advantages of this invention will become apparent from the following description.

According to this invention, there is provided an unsaturated polyester resin molded article having low profile and uniformly colored with a pigment, and reinforced with a filler and fiber, which is characterized by having a structure in which unconnected hollow balls having a diameter of 5 to 300$\mu$ with a wall of a styrene polymer containing 0.1 to 6 % by weight of carboxyl group, the wall having a thickness of 1 to 50$\mu$, are dispersed in a cured $\alpha,\beta$-ethylenically unsaturated polyester-styrene copolymer matrix, said styrene polymer having a refractive index less than 0.05 different from that of the unsaturated polyester-styrene copolymer, the total volume of the voids of the hollow balls being 10 to 25 % by volume of the volume of the copolymer. The molded article has a smooth surface, i.e. low profile, a high dimension stability and a good pigmentation and is free from a pastel or uneven coloration problem, and has a great practical value.

In the appended drawings, FIGS. 1 through 4 represent comparisons of the product of this invention with the product of the prior art.

Figure 2:
Figure 3:
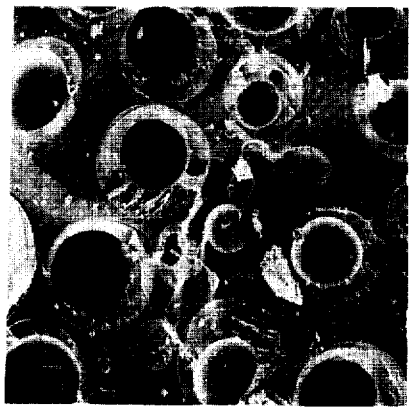
Figure 4:

The reason why the conventional unsaturated polyester resin molded article having low profile has a defect in pigmentation clarified by the present inventors is explained below referring to the accompanying drawings, in which FIG. 1 is a scanning type electron micrograph of a cured product of an unsaturated polyester resin composition which is a mixture of a styrene solution of an unsaturated polyester resin consisting of maleic acid and propylene glycol in equimolar amounts and a styrene solution of a polymer consisting essentially of methyl methacrylate in a weight ratio of 60 to 40 (U.S. Pat. No. 3,701,748). In FIG. 1, white granulated balls are present as islands in the cured unsaturated polyester resin sea and form very clearly a different phase. The term "granulated ball" used herein means a granulated ball composed of many fine particles aggregated and fine voids present between the particles. The granulated balls in FIG. 1 are probably considered to be composed of particles of a polymer consisting essentially of methyl methacrylate separated from the solution thereof in styrene at the time of polymerization of the styrene monomer, and the styrene polymer present between the said particles, and the black parts on the granulated balls are considered to be voids which compensate the polymerization shrinkage and thermal shrinkage. Since the interior of the cured product has such a structure, light is greatly scatteringly reflected on the surface of the granulated balls, whereby the cured product shows an appearance like chalk. Accordingly, even in the presence of a pigment, the color is cancelled by the white to make it pastel. Therefore, the effect of pigment is low. In the parts in which ribs and bosses are present or in which heat is particularly generated, the voids present on the surface of the granulated balls become larger. Therefore, the scattering reflection state is varied to cause uneven coloration. FIG. 2 in the accompanying drawings is an optical microphotograph of the same product as in FIG. 1. According to FIG. 2, fine concaves and convexes on the periphery of islands, i.e. balls are considered to mean that the surface of the islands themselves is granulated. FIG. 3 in the accompanying drawings is a scanning electron micrograph of a cured product of an unsaturated polyester resin composition consisting of a mixture of a solution in styrene of an unsaturated polyester of equimolar amounts of maleic acid and propylene glycol and a solution in styrene of a styrene polymer in a weight ratio of 60 to 40 (the present invention). In FIG. 3, in the unsaturated polyester portion are present as islands transparent hollow balls having a refractive index close to that of the unsaturated polyester portion. The black part in the balls is a void which compensates the polymerization shrinkage or the thermal shrinkage. When the cured product is exposed to light, the light is not so much reflected scatteringly at the interface of the unsaturated polyester portion and the hollow balls but penetrates the walls of the balls and reflects at the interface of the walls and the voids. Therefore, the cured product hardly becomes white as compared with the product in FIG. 1, and is transluscent or paraffin wax-like opaque. Accordingly, in the presence of a pigment, the pigmentation effect thereof is remarkable, and even in the parts in which there are ribs and bosses or in which heat is particularly generated, whitening is very slight. FIG. 4 in the accompanying drawings is an optical microphotograph of the same product as in FIG. 3, and shows that the hollow balls or islands are like water-blisters and hollow.

From the above facts, it can be seen that in order to solve the problem in pigmentation, the hollow balls present as islands in the unsaturated polyester are required to have an optically uniform composition. That is to say, if the unsaturated polyester is used in solution in styrene, the thermoplastic resin to be used must be in solution in styrene and be compatible with the polystyrene formed by curing. Accordingly, the styrene polymer which is used as thermoplastic resin to obtain the molded article of this invention is inevitably a substantial polystyrene. The term "substantial polystyrene" means herein a polymer comprising a major amount of styrene such that when an electron micrograph of a cured product of the liquid composition is observed the surface of islands is smooth like water-blisters and the polymer is not so greatly different in reflactive index from the unsaturated polyester-styrene copolymer which is the matrix, and that the voids are closed and in the spherical form and present in the islands. In this case, it is necessary for holding clearity that the difference in reflactive index between the unsaturated polyester-styrene copolymer and the substantial polystyrene is less than 0.05, preferably less than 0.03. The diameter of the hollow balls is 5 to 300$\mu$, preferably 10 to 200$\mu$, and when it is less than 5$\mu$, the degree of scattering reflection becomes greater, and the transparency is lost, and when it is more than 300$\mu$, a defect in appearance of the molded article tends to occur. The thickness of the walls of the hollow balls depends upon the degree of foaming at the time of curing and affects the low profile. It is, however, preferably 1 to 50$\mu$.

The curing conditions for giving such a structure are, of course, such that the temperature is higher than the boiling point of the styrene at the internal pressure at the time of foaming thereof in the substantial polystyrene balls. However, the temperature is too high, a defect in appearance of molded article tends to occur. The curing is preferably effected at a mold temperature of 120° to 170°C, more preferably 130° to 160°C.

The molded article of this invention is obtained by molding a molding compound at a mold temperature of 120° to 170°C by means of a press-molding machine, an injection-molding machine, a transfer-molding machine, or the like, said molding compound being prepared, in the case of bulk molding compound (referred to hereinafter as BMC), by well mixing, per 100 parts by weight of the molding material, 25 to 65 parts by weight of a mixture of 15 to 60 parts by weight, preferably 20 to 35 parts by weight of a resin solution consisting of an $\alpha,\beta$-ethylenically unsaturated polyester, styrene monomer and a styrene polymer containing 0.1 to 6 % by weight of carboxyl group; 0.02 to 5 parts by weight, preferably 0.03 to 3 parts by weight, of a thickening agent; and 0.1 to 10 parts by weight, preferably 0.2 to 4 parts by weight, (as solids) of a pigment, with, for example, 35 to 60 parts by weight of a filler, 0.5 to 2 parts by weight of a curing catalyst, and 0.5 to 2 parts by weight of a releasing agent and then mixing the resulting mixture with 10 to 30 parts by weight of a reinforcing fiber, or in the case of sheet molding compound (referred to hereinafter as SMC), by mixing the above components other than the reinforcing fiber to form a paste and then subjecting the paste to an SMC-producing machine in a conventional manner to sandwitch a corresponding amount of the reinforcing fiber in between two sheets of the paste. The above resin solution is preferably composed of 5 to 30% by weight of the styrene polymer and, as the remainder, the $\alpha,\beta$-ethylenically unsaturated polyester and styrene monomer in relative amounts of 20 to 80% by weight of said $\alpha,\beta$-ethylenically unsaturated polyester and 80 to 20% by weight of said styrene monomer.

Concerning the molding compound in this field, there has also been the following problem to be solved: When the $\alpha,\beta$-ethylenically unsaturated polyester solution in styrene has a low acid number, the molding compound, even when containing a thickening agent, is not sufficiently thickened and is tacky, though has substantially no problem concerning low shrinkage and pigmentation. As is well known, sufficient thickening of a molding compound makes the molding compound free from tackiness, and hence, is important not only in that the molding material becomes easily handleable but also in that more uniform distribution of fibrous material in the resulting molded article is achieved. For instance, in order that a polyethylene film, which has been coated on an SMC may easily be stripped therefrom, it is necessary that the molding compound has sufficiently been thicknned. However, in the case of a resin system consisting of a conventional styrene polymer and an $\alpha,\beta$-ethylenically unsaturated polyester, the styrene polymer does not take part in the thickening of the resin system under conventional application conditions, though this varies depending on the mixing proportions of the resins, and the thickening is exclusively dependent upon the interaction between the thickening agent incorporated therein and the terminal carboxyl groups of the $\alpha,\beta$-ethylenically unsaturated polyester molecules. Accordingly, it is necessary that the acid number of a 67 % solution in styrene of the $\alpha,\beta$-ethylenically unsaturated polyester is at least 20. Even when such a polyester is used, however, the resulting SMC is still tacky, and a film coated on the SMC is difficult to strip. Thus, the use of a polyester having the above-mentioned acid number is still unsatisfactory. Moreover, in order to enhance characteristics of molded article, such as water resistance, weather resistance, corrosion resistance, heat resistance and the like, an $\alpha,\beta$-ethylenically unsaturated polyester of the isophthalic acid type, bisphenol type, hydrogenated bisphenol type, neopentyl type or halogen-containing type has been so prepared as to contain a smaller proportion of carboxyl group per molecule or a smaller amount of free carboxyl group. Accordingly, the acid number of a 67 % solution in styrene of said polyester is 15, in most cases. Particularly in the case of an α,β-ethylenically unsaturated polyester of the isophthalic acid type, it is said that in order to obtain a molded article having the aforesaid characteristics, the acid number of the polyester should be low, preferably up to 10. A molding compound containing such an α,β-ethylenically unsaturated polyester cannot sufficiently be thickened, and it is the actual state that an SMC which has been thickened is barely obtained by making the amount of polystyrene solution incorporated as small as possible, i.e. by sacrificing the low shrinkage. Accordingly, no satisfactory molded article has been obtained from said SMC. An α,β-ethylenically unsaturated polyester of the bisphenol type may sometimes have an acid number of about 15 (in 67 % solution in styrene), but when used in combination with a solution in styrene of a polystyrene, the said polyester has lower thickening property than such a conventional α,β-ethylenically unsaturated polyester having an acid number of 15 (in 67 % solution in styrene) as propylene glycol maleate or propylene glycol maleate phthalate, and thus, it is difficult to obtain an SMC which is excellent in strippability of coated film or an SMC and a BMC which are low in surface stickiness, using the bisphenol type polyester. The above-mentioned problem has been resolved by using the styrene polymer containing 0.1 to 6 % by weight of carboxyl group.

In order to obtain a uniformly pigmented molded article, the thermoplastic resin, i.e. the styrene polymer, is required to be a polymer which is compatible with a polystyrene formed by polymerization of the styrene monomer used as the solvent for the unsaturated polyester, i.e., the substantial polystyrene, and contains 0.1 to 6 % by weight of carboxyl group for sufficiently thickening the molding compound by the action of the thickening agent. Preferable is a copolymer of styrene and an aliphatic unsaturated carboxylic acid, particularly 2 to 5 % by weight of methacrylic acid. If the amount of the acid group is smaller than mentioned above, the molding compound tends to become insufficient in thickening property, while if the amount thereof is larger than mentioned above, the structure of the resin part in the molded article approaches FIG. 1 of the accompanying drawings, and hence, the appearance tends to become white, though slightly, and the gloss tends to be degraded. The kind of the carboxylic acid for introducing the carboxyl group into the styrene polymer is not critical though it is preferably an aliphatic unsaturated carboxylic acid having 3 to 7 carbon atoms, such as, for example, methacrylic, acrylic, maleic, fumaric, itaconic or crotonic acid. The molecular weight of the styrene polymer is not critical, though the polymer preferably has a molecular weight corresponding to a reduced viscosity ($\eta sp/C$) of about 0.3 to 0.45 dl/g as measured in dimethylformamide at 25°C (the same shall apply hereinafter). The molecular weight is too small, it is difficult for the molded article to take the above-specified structure after curing, and the structure of the cured product approaches a single phase structure free from islands, whereby the low shrinkage effect is lost. On the other hand, if the molecular weight is too large, the viscosity of the resin solution becomes too high and handling becomes difficult. At the same time, the diameter of the hollow balls formed at the time of curing tends to become large and the gloss and appearance of the molded article are deteriorated. Since the viscosity of the resin solution increases with an increase in amount of carboxyl group, it is preferable that the reduced viscosity of the styrene polymer is adjusted to a value somewhat lower than desired. The styrene polymer may contain a third copolymerizable monomer, such as, α-methylstyrene, halogenated styrenes, acrylonitrile or the like, in such a small amount that the nature of the substantial polystyrene may be retained.

The α,β-ethylenically unsaturated polyester used in this invention is not critical, and may be any of those which have been known hitherto, for example, condensates of maleic anhydride and dihydric alcohol, e.g., alkylene glycol or bisphenol, or maleic anhydride, a dibasic saturated carboxylic acid or ester-forming equivalent and a dihydric alcohol. In order to achieve low profile, however, it is preferable to use an α,β-ethylenically unsaturated polyester having a low molecular weight per double bond, such as a maleic anhydride-propylene glycol addition condensate. Even if the molecular weight is higher, however, a considerable effect can be expected. In addition to the polyester of the maleic acid type, there may be used a polyester of, for example, the isophthalic acid type or bisphenol A type. A BMC, which has been prepared from a bisphenol type unsaturated polyester having a molecular weight of more than 500 per double bond, e.g. Atlac 382A (produced by Kao-Atlas Co.), has a shrinkage as high as 0.62 %. This shrinkage, however, can be lowered to 0.32 by incorporating the styrene polymer and can be further lowered to 0.21 by additional incorporation of a small amount of polyethylene powder, thereby making it possible to obtain a molded article having a smooth surface. Alternatively, there may be used a hydrogenated bisphenol type polyester or a halogen-containing α,β-ethylenically unsaturated polyester, e.g. No. 6399 produced by Diamond Shamrock Co.

The thickening agent used in the present invention is a compound capable of making any bond to carboxyl groups. Examples of such a compound include oxides and hydroxides of alkaline earth metals, preferably magnesium oxide, magnesium hydroxide, calcium oxide and calcium hydroxide. These may be used either alone or in admixture of two or more. Alternatively, clay (aluminum silicate) or aluminum hydroxide may also be used. The amount thereof is 0.02–5 parts by weight per 100 parts by weight of the molded article.

As the pigment, there is conventionally used a so-called processed pigment prepared by dispersing a pigment in a relatively stable liquid polyester to a concentration of 20 to 60 %. The amount of the pigment used is 0.1–10 parts by weight, preferably 0.2–4 parts by weight as solids.

As the filler, there may be used, for example, calcium carbonate, clay or aluminum hydroxide. The amount of the filler is 5 to 70 % by weight based on the weight of the molded article. The curing catalyst is preferably a free radical catalyst of the peroxide or azo type which is not destroyed until a relatively high temperature is reached in a heated mold, though the amount and kind thereof are decided in consideration of the storage stability and curing rate of the molding compound. The peroxide type catalyst is, for example, tert-butyl perbenzoate, cyclohexanone peroxide or tert-butyl peroxy-2-ethylhexanoate, and the azo type catalyst is, for example, 1,1'-azobis(cyclohexane-1-carbonitrile). In preparing the molding compound, there may be used a polymerization inhibitor. The polymerization inhibitor is a free radical inhibitor which is used in order not only to impart a sufficient stability to the molding compound during storage but to full fill a mold with the molding compound at the time of molding, and includes, for example, hydroquinone, p-benzoquinone and catechol. As the releasing agent, there is usually used a so-called internal releasing agent such as, for example, a metallic soap, preferably zinc stearate or Zelec (a phosphate produced by Du Pont). As the reinforcing fiber, there may be used a glass, carbon or boron fiber, preferably a glass fiber. Alternatively, an organic fiber such as a polyvinyl alcohol, acrylic or sisal fiber may also be used. Further, up to 5 % of a polyethylene powder may be used to make the surface state of the molded article better.

The present invention is explained in more detail below with reference to examples, but the examples are by way of illustration and not by way of limitation. In the examples, all parts and percentages are by weight.

EXAMPLE 1

60 Parts of a 67.5 % solution of propylene glycol maleate in styrene monomer (acid number 22) (refractive index of cured product, 1.57), 40 parts of a 40 % solution in styrene monomer of a copolymer ($\eta sp/C = 0.4$) (refractive index, 1.58) of styrene and 3 % of methacrylic acid, 1.0 part of tert-butyl perbenzoate, 0.3 part of benzoyl peroxide and 35 parts of TR 2453 (a toner containing 20 % of Phthalocyanine Blue B; produced by Toyo Ink Co.) were sufficiently stirred together by means of a stirrer to form a homogeneous mixture, which was then transferred to a kneader. In the kneader, the mixture was homogeneously kneaded with 200 parts of calcium carbonate, 5 parts of zinc stearate, 4 parts of magnesium hydroxide and 60 parts of a glass fiber of 6 mm. in length in this order to prepare a BMC.

The thus prepared BMC was subjected to measurement of thickening behavior at 35°C to obtain the results set forth in Table 1.

The viscosity of the BMC was measured in such a manner that after preparation, the BMC was inserted between two cellophane papers at given intervals of time and then molded under a pressure of 50 kg/cm² by use of a cold press to a disc of 7 cm in diameter and 1 cm in thickness, and the surface hardness of the disc after removal of the cellophane papers was measured by use of a Shore hardness tester.

Table 1

| Time after preparation (hours) | 0 | 24 | 48 | 72 | 96 | 102 |
|---|---|---|---|---|---|---|
| Shore A hardness | 25 | 35 | 52 | 70 | 78 | 82 |

According to the results shown in Table 1, the BMC reached a sufficient hardness and became substantially free from tackiness when allowed to stand for 72 hours after preparation.

Further the BMC, which had been allowed to stand for 72 hours after preparation, was molded by a press-molding machine at 150°C for 2 minutes to a 3 mm-thick flat plate having a rib of 1 cm in depth and 1 cm in width, whereby a deep-colored plate substantially free from unevenness in color was obtained. The plate showed a shrinkage of 0.04 % and was excellent in surface smoothness. Observation of the resin part by means of a scanning type electron microscope revealed that there are unconnected hollow balls having a diameter of about 30μ and a wall thickness of about 5μ dispersed in the resin part.

EXAMPLE 2

50 Parts of a 68 % solution in styrene monomer of an α,β-ethylenically unsaturated polyester composed of 5 moles of maleic acid, 5 moles of isophthalic acid and 10 moles of propylene glycol (acid number 8.5) (refractive index of cured product, 1.56), 50 parts of a 42 % solution in styrene monomer of a copolymer ($\eta sp/C = 0.38$) (refractive index, 1.75) of styrene and 7.1 % of acrylic acid, 1.4 parts of tert-butyl perbenzoate and 35 parts of TR 851 (a toner containing 20 % of carbon black; produced by Toyo Ink Co.) were sufficiently stirred together by means of a stirrer to form a homogeneous mixture, which was then transferred to a kneader. In the kneader, the mixture was homogeneously kneaded with 220 parts of aluminum hydroxide, 5 parts of zinc stearate, 4 parts of magnesium hydroxide and 60 parts of a glass fiber of 6 mm in length in this order to prepare a BMC.

The thus prepared BMC was subjected to measurement of thickening behavior at 35°C in the same manner as in Example 1 to obtain the results as set forth in Table 2.

Table 2

| Time after preparation (hours) | 0 | 24 | 48 | 72 | 96 | 120 |
|---|---|---|---|---|---|---|
| Shore A hardness | 35 | 48 | 60 | 69 | 78 | 80 |

The BMC, which had been allowed to stand for 120 hours after preparation, was charged into a disc mold, without inserting between cellophane papers, and pressed, without heating, under a pressure of 50 kg/cm², when the BMC scarcely adhered to the mold.

Further, the present BMC, which had been allowed to stand for 120 hours after preparation, was molded in the same manner as in Example 1 to obtain a molded article pigmented satisfactorily and the state of pigmentation was far greater than that in the case of a molded article obtained by use of a BMC prepared from a commercially available one-pack type, coloring unsaturated polyester. The thus obtained molded article showed a shrinkage as low as 0.06 % and had a smooth surface. Observation of the resin part by means of a scanning type electron microscope revealed that there are unconnected balls having a diameter of about 40μ and a wall thickness of about 8μ dispersed in the resin part.

EXAMPLE 3

60 Parts of a 75.3 % solution in styrene monomer of PM 9905 (a hydrogenated bisphenol type unsaturated polyester produced by Takeda Yakuhin Co.) (acid number 12.6) (refractive index of cured product, 1.57), 40 parts of a 40 % solution in styrene monomer of a copolymer ($\eta sp/C = 0.42$) (refractive index, 1.58) of styrene and 3 % of maleic acid, a curing catalyst consisting of a mixture of 1.0 part of tert-butyl perbenzoate and 0.2 part of tert-butyl peroxy-2-ethylhexanoate, 18 parts of TR 105 Red (a toner containing 60 % of cadmium red; produced by Toyo Ink Co.) and 6 parts of a powdery polyethylene were sufficiently stirred together by means of a stirrer to form a homogeneous mixture. This mixture was homogeneously kneaded at below 40°C with 150 parts of calcium carbonate and 3 parts of zinc stearate, and then mixed with 0.9 part of calcium hydroxide as a thickening agent. Immediately thereafter, the mixture was subjected to an SMC producing machine, and then blended with 20 % of a glass fiber to prepare an SMC.

The thus prepared SMC was coated with a polyethylene film, and the thickening behavior thereof at 35°C, in terms of the degree of stripping of the polyethylene film from the SMC, was measured. As the result, the SMC immediately after preparation adhered to the polyethylene film but, after the lapse of 2 days, the SMC became hard, and, even when the polyethylene film was stripped, the amount of the SMC adhered to the film was small. After the lapse of 4 days, the SMC was more enhanced in hardness and showed no feeling of stickiness at the time of stripping of the film from the SMC. The SMC after the lapse of 4 days was so hard as to bring about any particular drawback from the operational standpoint.

The SMC was molded in the same manner as in Example 1 to obtain a molded article which had been pigmented substantially uniformly. The molded article showed a shrinkage of 0.08 %, was quite satisfactory in surface smoothness, and was excellent in gloss. Observation of the resin part by means of a scanning type electron microscope revealed that there are unconnected balls having a diameter of about $30\mu$ and a wall thickness of about $8\mu$.

As is clear from the above-mentioned facts, an unsaturated polyester resin molded article, in which the carboxyl group-containing styrene polymer is used, has a great improvement in handling in the course of obtaining the article and is simultaneously excellent in color, gloss and profile.

What is claimed is:

1. A filler- and fiber-reinforced, uniformly pigmented, unsaturated polyester resin molded article having low profile, which comprises a structure in which unconnected hollow balls having a diameter of 5 to $300\mu$ with a wall of a styrene polymer containing 0.1 to 6% by weight of carboxyl group, the wall having a thickness of 1 to $50\mu$, are dispersed in a cured $\alpha,\beta$-ethylenically unsaturated polyester-styrene matrix; the amount of said styrene polymer being 5 to 30% by weight based on the weight of the total resin components and the unsaturated polyester-styrene copolymer consisting of 20 to 80% by weight of unsaturated polyester and 80 to 20% by weight of styrene; said styrene polymer having a refractive index less than 0.05 different from that of the copolymer, the total volume of voids of the hollow balls being 10 to 25% by volume based on the volume of the copolymer.

2. A molded article according to claim 1, wherein the styrene polymer is a copolymer of styrene and an aliphatic unsaturated carboxylic acid.

3. A molded article according to claim 2, wherein the unsaturated carboxylic acid is at least one unsaturated carboxylic acid having 3 to 7 carbon atoms.

4. A molded article according to claim 1, wherein the pigment is contained in a proportion of 0.1 to 10 parts by weight per 100 parts by weight of the molded article.

5. A molded article according to claim 1, wherein the fiber is a glass fiber.

6. A molded article according to claim 1, wherein the unsaturated polyester is a condensate of maleic anhydride and dihydric alcohol or maleic anhydride, a saturated dibasic carboxylic acid or ester-forming equivalent and a dihydric alcohol.

7. A molded article according to claim 1, wherein the unsaturated polyester is selected from the group consisting of those of isophthalic acid type, bisphenol type, hydrogenated bisphenol type and halogen-containing type, and has an acid number of not more than 15 as measured in the form of a 67 % solution in styrene.

8. A method for producing a filler- and fiber-reinforced, uniformly pigmented, unsaturated polyester molded article, which comprises heating in a mold at a temperature of 120° to 170°C a sheet or bulk molding compound consisting essentially of 15 to 60 parts by weight, per 100 parts by weight of the compound, of a resin solution consisting of 5 to 30% by weight of a styrene polymer containing 0.1 to 6% by weight of carboxyl group, and, as the remainder of said solution, an $\alpha,\beta$-ethylenically unsaturated polyester and styrene monomer in relative amounts of 20 to 80% by weight of said $\alpha,\beta$-ethylenically unsaturated polyester and 80 to 20% by weight of said styrene monomer; a filler; a reinforcing fiber; a thickening agent; and a pigment to cure the resin solution, thereby forming a structure in which unconnected hollow balls having a diameter of 5 to $300\mu$ with a wall of a styrene polymer are dispersed in a cured $\alpha,\beta$-ethylenically unsaturated polyester-styrene copolymer matrix, the total voids of hollow balls being 10 to 25% by volume based on the volume of the copolymer.

9. A method according to claim 8, wherein the styrene polymer has a reduced viscosity of 0.30 to 0.45 dl/g as measured in dimethylformamide at 25°C.

10. A method according to claim 8, wherein the thickening agent is contained in an amount of 0.02 to 5 parts by weight per 100 parts by weight of the compound.

* * * * *